United States Patent
Johnson et al.

[11] Patent Number: 6,141,856
[45] Date of Patent: Nov. 7, 2000

[54] METHOD OF FABRICATING ROTORS WITH RETAINING CYLINDERS AND REDUCED HARMONIC FIELD EFFECT LOSSES

[75] Inventors: Roger Neal Johnson, Hagaman; Gerald Burt Kliman, Niskayuna, both of N.Y.; Yuefeng Liao, Brookfield, Wis.; Wen Liang Soong, Schenectady, N.Y.

[73] Assignee: General Electric Company, Schenectady, N.Y.

[21] Appl. No.: 09/072,322

[22] Filed: May 4, 1998

Related U.S. Application Data

[62] Division of application No. 08/770,215, Dec. 19, 1996, Pat. No. 5,801,470.

[51] Int. Cl.$^7$ ........................................... H02K 15/02
[52] U.S. Cl. ............................................. 29/598; 310/42
[58] Field of Search ........................... 29/598; 310/42, 310/271, 156

[56] References Cited

U.S. PATENT DOCUMENTS

| | | |
|---|---|---|
| 3,593,049 | 7/1971 | Nurnberg et al. . |
| 3,727,302 | 4/1973 | Phelon . |
| 3,789,250 | 1/1974 | Macoit et al. . |
| 4,012,651 | 3/1977 | Burson . |
| 4,146,809 | 3/1979 | Rielly . |
| 4,227,105 | 10/1980 | Kumakura . |
| 4,433,261 | 2/1984 | Nashiki et al. . |
| 4,636,107 | 1/1987 | Casler et al. . |
| 4,729,160 | 3/1988 | Brown . |
| 4,843,271 | 6/1989 | Shah . |
| 4,916,344 | 4/1990 | Hammer et al. . |
| 4,953,284 | 9/1990 | Hammer et al. . |
| 5,038,065 | 8/1991 | Matsubayashi et al. . |
| 5,091,668 | 2/1992 | Cuenot et al. . |
| 5,485,045 | 1/1996 | Canders et al. . |
| 5,528,095 | 6/1996 | Strobl . |

FOREIGN PATENT DOCUMENTS

| | | |
|---|---|---|
| 1613208 | 2/1967 | Germany . |
| 3-195338 | 8/1991 | Japan . |
| 3195338 | 8/1991 | Japan . |
| 678482 | 8/1992 | Japan . |
| 678481 | 3/1994 | Japan . |

*Primary Examiner*—S. Thomas Hughes
*Assistant Examiner*—John C. Hong
*Attorney, Agent, or Firm*—Ann M. Agosti; Jill M. Breedlove

[57] ABSTRACT

A rotor includes a shaft; a permanent magnet layer; and a retainer comprising a conductive, low magnetic permeability material bound to the rotor shaft. The permanent magnet layer is semi-restricted between the shaft and the retainer. In one embodiment, the magnet layer includes a molded ring magnet. In another embodiment, the magnet layer includes a plurality of magnet segments which can be situated on the rotor in rotor pockets or in a rotor cage. The bond between the retainer and the rotor can be enabled by a cap or by support elements. A high conductivity material can be situated over the retainer with the combination of the retainer and the high conductivity material having a resistivity high enough to minimize space harmonic losses and low enough to minimize time harmonic losses. The high conductivity material can also be applied to induction rotors for excluding high frequency components while permitting penetration of low frequency torque producing fields.

17 Claims, 6 Drawing Sheets

METHOD OF FABRICATING ROTORS WITH RETAINING CYLINDERS AND REDUCED HARMONIC FIELD EFFECT LOSSES

This is a division of application Ser. No. 08/770,215, filed Dec. 19, 1996 now U.S. Pat. No. 5,801,470.

The invention was made with Government support under contract number 70NANB5H1119 awarded by the National Institute of Standards and Technology.

BACKGROUND OF THE INVENTION

In conventional high speed permanent magnetic (PM) motors, magnet retention is achieved by shrinking or pressing a high strength shell over the magnets. The shell must have low permeability (preferably 1.00) to avoid short circuiting the magnet flux, have low electrical conductivity to minimize space and time harmonic losses, and comprise a thin layer of material having sufficient strength to provide for magnet retention. The thickness of the shell preferably ranges from about 0.01 inches to about 0.12 inches. Conventional shell materials are austenitic stainless steel or a heat-treatable alloy containing primarily nickel, chromium, and iron. The shell must be highly stressed to avoid separation of the magnets from the shaft at high rotor operation speeds. Thus, a tight interference fit must be used which requires large temperature differentials or force during assembly, and tight tolerances, for motors capable of operating at very high speeds. The materials that can be used for the permanent magnets are limited to those materials that can withstand the high temperatures and stresses required for fabrication.

An alternative embodiment is to turn the motor "inside-out" so that the stationary windings occupy the center position and the rotor yoke turns on the outside. In this embodiment, the magnets are held against the centrifugal forces by the yoke itself so that only some projections and adhesive are needed to position and secure the magnets. No retainer is needed in the magnetic circuit to increase the gap. Such inside-out motors typically require much more space than conventional motors and have correspondingly increased stresses thereon.

Harmonic fields resulting from inverter chopping (or pulse width modulation) and spatial variation (slotting) of stator fields often create excessive losses in magnet retainers, magnets, and rotor cores of permanent magnet motors. Analogous losses occur in induction motors from induced surface (pole face losses) and circulating currents (eddy current losses) in the rotor bars. These losses represent a substantial portion of the stray load losses present in fixed frequency induction motors.

Thin copper layers are sometimes used in conjunction with high permeability layers to exclude high frequency fields from shielded rooms. Copper has been explosively bonded to solid stainless steel slot wedges in a high speed, wound field generator to shield the slot wedges from space harmonics. These principles have not been applied to permanent magnet or induction motors.

SUMMARY OF THE INVENTION

It would be desirable to have an efficient method for fabricating permanent magnetic rotors for high speed integral horsepower motors.

It would also be desirable to reduce losses in induction and permanent magnet motors that result from harmonic fields.

In the present invention, a motor has a retainer which is designed to hold the magnets as if the motor were an inside-out motor with no preload. In conventional systems, sufficient radial preload is applied to provide a heavy interference fit of about 1 mil per inch of diameter between the retainer and a rotor shaft to ensure that nothing moves within the rotor. In the present invention, a light interference fit (preferably less than or equal about 0.5 mils per inch of diameter) is used between the retainer and the magnets, and the magnets can expand several mils or more as the speed of the shaft is raised from standstill to full speed. To maintain a balanced rotor, the magnets must stay in contact with the retainer during speed changes and not shift. Cylindrically shaped permanent magnets either whole or in segments can be held over a steel shaft by a metal alloy retaining cylinder in a less restrictive manner than conventional magnets are held. The magnets expand or are otherwise forced outwards during rotor rotation to follow the expansion of the retainer. The present invention thereby eliminates the need for a tight interference fit of a retainer sleeve and a portion of the close tolerance radial dimensions that are associated with the tight interference fit assembly process. The present invention additionally enables the use of molded magnets which cannot tolerate the elevated temperatures required for large interference shrink fits.

In another embodiment of the present invention, a thin layer of high conductivity material is applied on the surface of a rotor to exclude high frequency components while permitting full penetration of low frequency fields for torque production.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
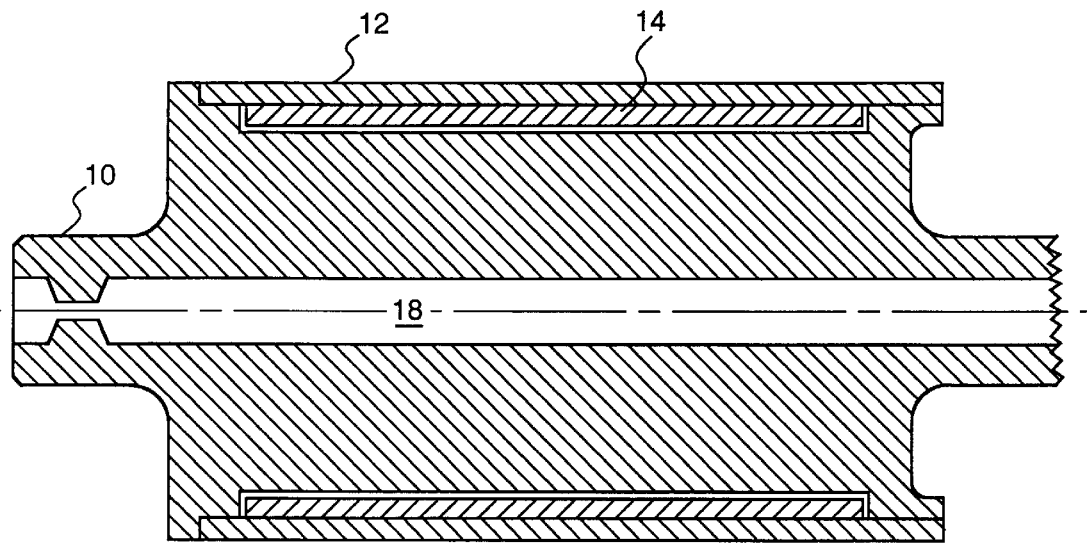
FIG. 1 is a sectional side view of one embodiment of a rotor of the present invention comprising a shaft, a permanent magnet layer, and a retainer.

FIG. 1 is a sectional side view of one embodiment of a rotor of the present invention comprising a shaft 10, a permanent magnet layer 14, and a retainer 12. The shaft comprises a high permeability magnetic metal such as steel having an optional hollow core 18 to increase rotational critical speed and/or permit through flow of a fluid. The retainer often comprises a conductive material having high strength and low magnetic permeability, such as INCONEL™ 718 (a trademark of Inco International, Inc. of Huntington, W. Va., for a corrosion-resistant alloy containing primarily nickel, chromium, and iron). The retainer can alternatively comprise a composite of non-conductive materials such as KEVLAR™ aromatic polyamide fibers (KEVLAR is a trademark of E.I. duPont de Nemours & Co.). Retainer 12 provides the necessary support for the magnet layer 14 to resist centrifugal forces. In one embodiment the retainer is cylindrical and has a thickness ranging from about 0.04 inches to about 0.12 inches.

In the embodiment of FIG. 1, the magnet layer comprises a continuous ring magnet that is fabricated and mated to the retainer with a light interference fit. In one embodiment the magnet layer material comprises a NdFeB bonded magnet having a thickness ranging from about ⅛ of an inch to about ⅜ of an inch. The magnet is semi-restricted (not rigidly attached to the shaft or core) and thus, in one embodiment, will expand as speed is increased to stay in contact with the retainer because its stiffness is less than the ring stiffness. Thus, close control of the inside radius dimension of the magnet layer and the outside radius of the adjacent shaft is not required.

Furthermore, heating the retainer to approximately 1000° F. for assembly to achieve the required preload necessary to exceed centrifugal forces is avoided. Because such heat is not required, use of molded magnets with a polymer binder is feasible.

The retainer can be welded to one or both ends of shaft 10. Welding the ends of the retainer to the shaft forms an integral structure which will have a more predictable critical speed than a tightly interference-fitted assembly.

Figure 2:
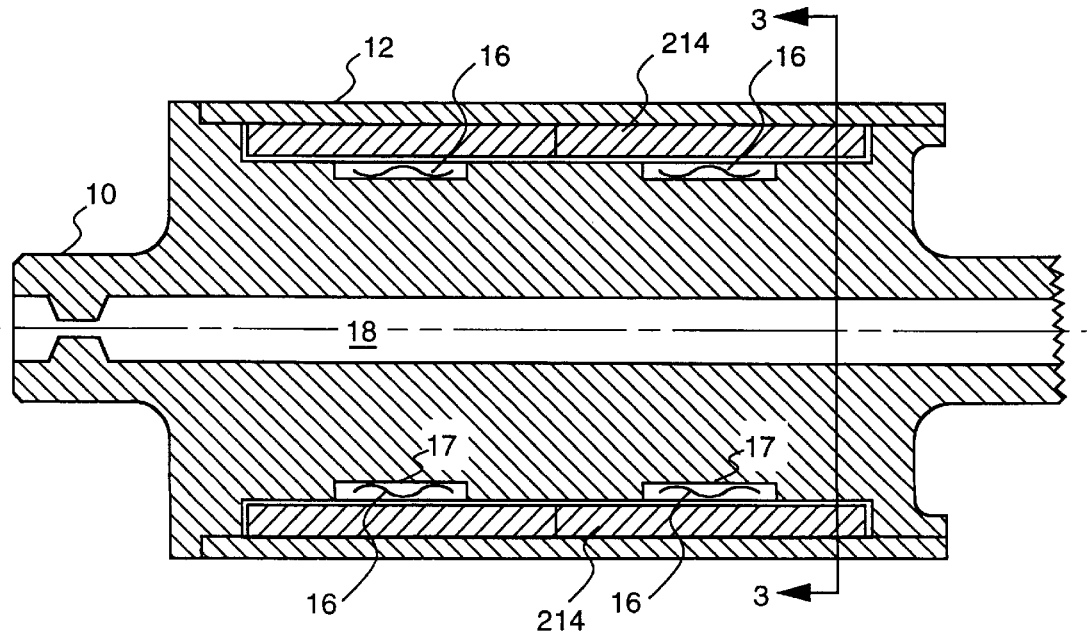
FIG. 2 is a view similar to that of FIG. 1, further showing springs for positioning permanent magnets.
Figure 3:
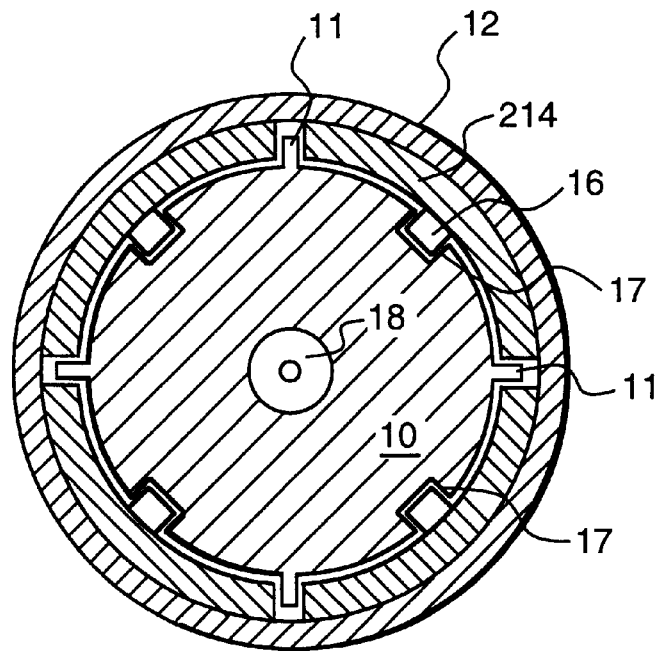
FIG. 3 is a view along line 3—3 of FIG. 2.

FIG. 2 is a sectional side view of another embodiment of a rotor of the present invention, and FIG. 3 is a view along line 3—3 of FIG. 2. The layer of permanent magnet material in this embodiment comprises segments 214 of permanent magnet material each having an outside radius substantially the same as the inside radius of the retainer. Magnet materials generally do not have sufficient strength or are too brittle to be self-supporting in high speed rotors. Retainer 12 provides the necessary support for the magnet segments 214 to resist centrifugal forces.

Shallow pockets forming rotor protrusions 11 (shown in FIG. 3) can be machined in the shaft surface to situate the magnets. The protrusions can be used to separate individual magnets so that the magnets do not contact each other and are semi-restricted in that they can move slightly between the protrusions, shaft surface and retainer. Springs 16 can be used between shaft 10 and magnet segments 214 for preloading the magnet segments against the inside of the retainer. The springs are inserted into wells 17 in the shaft, and the magnets inserted over the springs and are temporarily restrained radially by rubber bands, for example, until the retainer is installed over the magnets. This embodiment provides a dynamically balanced rotor assembly and is particularly useful for magnets such as sintered or heat-processed magnets that do not change their shape as easily as polymer bonded magnets.

The fit between the magnets and the pockets can be relatively loose, on the order of a few mils. The leaf springs hold the magnets in contact with the retainer as they move radially to follow the expansion and contraction of the retainer as the rotor speed varies.

Figure 4:
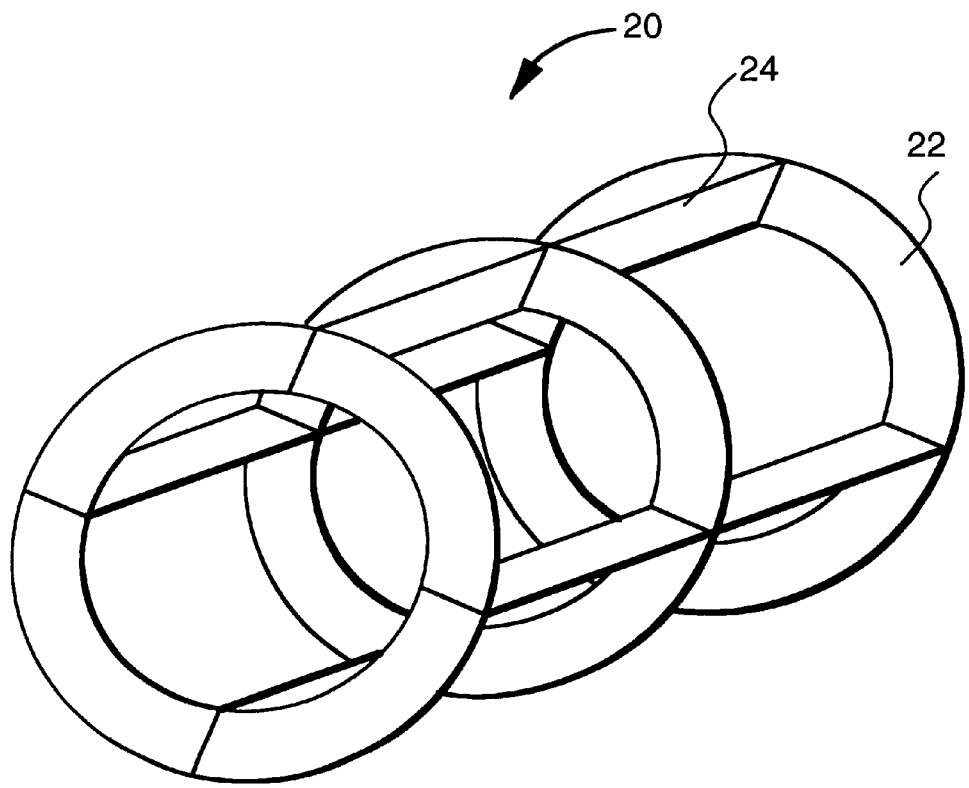
FIG. 4 is a perspective view of a cage for holding rotor material of the present invention.

FIG. 4 is a perspective view of a cage 20 for holding rotor material of the present invention. This embodiment is similar to that of FIG. 2 except that instead of creating protrusions or machining pockets in the rotor, a separate structure is provided. This structure may comprise, for example, a stainless steel cage fabricated with intersecting rings 22 and struts 24. In an alternate embodiment, the structure may comprise a thin sheet, at the inner diameter of the magnets, configured with protrusions that act to situate the magnets and, in the other direction, springs to lightly preload them against the restraint.

Figure 5:
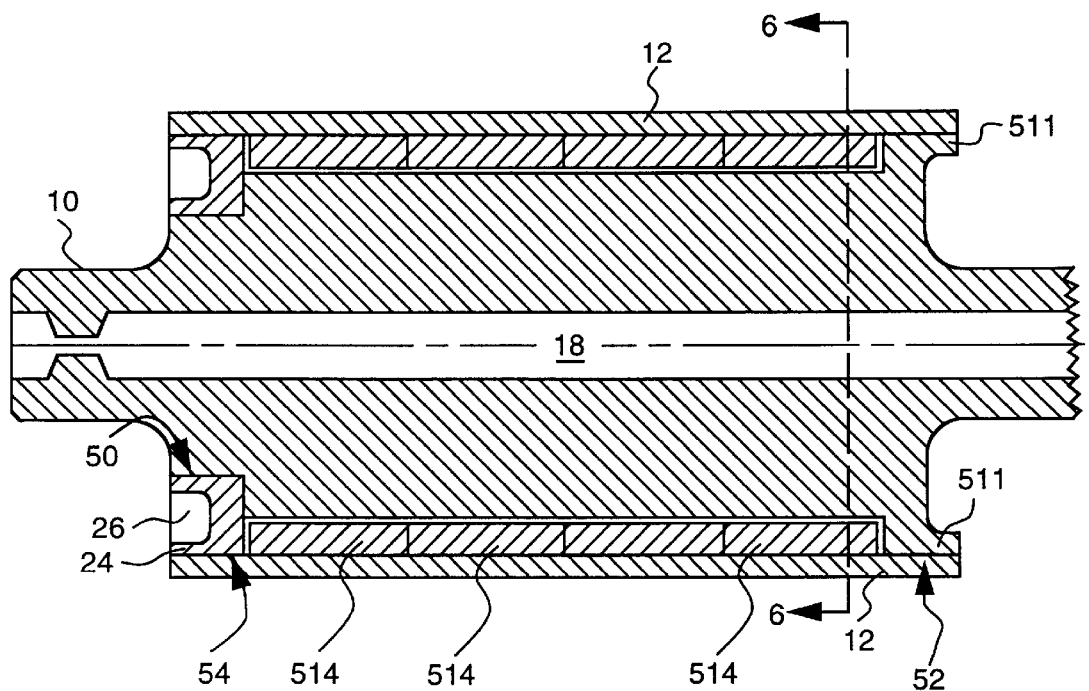
FIG. 5 is a view similar to that of FIG. 1, further showing a weld cap.
Figure 6:
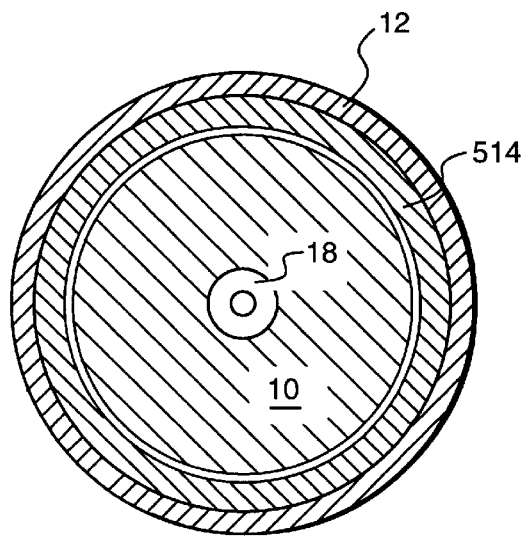
FIG. 6 is a view along line 6—6 of FIG. 5.

FIG. 5 is a sectional side view of another embodiment of a rotor of the present invention, and FIG. 6 is a view along line 6—6 of FIG. 5. To install cylindrical magnets 514 which are one piece rings, an end of the rotor must be open to permit the magnets to be installed axially. In one embodiment, the other end of the rotor includes a radial projection 511.

Prior to assembly, the retainer and shaft are heat-treated and finish-machined. To achieve a light interference fit, the magnets and retainer cylinder are finished on the outer diameter and inner diameter surfaces, respectively. The outer diameter of the shaft beneath the magnets can be approximately 0.01 inches less than the magnet inner diameter, thereby ensuring that an open radial gap extending from the inner surface of the permanent magnetic layer to the rotor shaft exist. The joints to be welded must have tight interference fits adjacent to the welds to maintain diametrical contact of surfaces during operation and to minimize cyclic stresses on weld joints. The magnitude of cyclic or alternating stress has a large effect upon fatigue life of metallic components.

The retainer can be pressed or shrunk onto a weld cap 24 comprising steel, for example, and the retainer/weld cap joint 54 can be welded with a minimal heat input process such as an electron beam or laser welding process. The retainer temperature can be raised approximately 150° C. above ambient and the magnets (in an unmagnetized state) inserted in retainer 12 to achieve a light interference fit. The shaft 10 can be chilled with a liquid such as nitrogen ($N_2$), for example, to approximately −100° C. and slid into the heated subassembly of the retainer and the magnets. The term "slid" is meant to encompass a situation either where the retainer and magnets are held in position while the shaft is moved or where the shaft is held in position and the retainer and magnets are moved. The two remaining joints 50 and 52 can be welded again by an electron beam weld or equivalent process which can achieve adequate penetration without over-heating the magnets. If an electron beam weld is used, the beam must come in parallel to the shaft and the shaft must be demagnetized to avoid defocusing and deflecting the beam. It may be possible to use lasers for some of this welding.

In another embodiment, the retainer and magnets can be applied to the shaft prior to being attached to the weld cap. After the weld cap is positioned, welds between the retainer and weld cap, weld cap and shaft, and retainer and projection are then provided.

Figure 7:
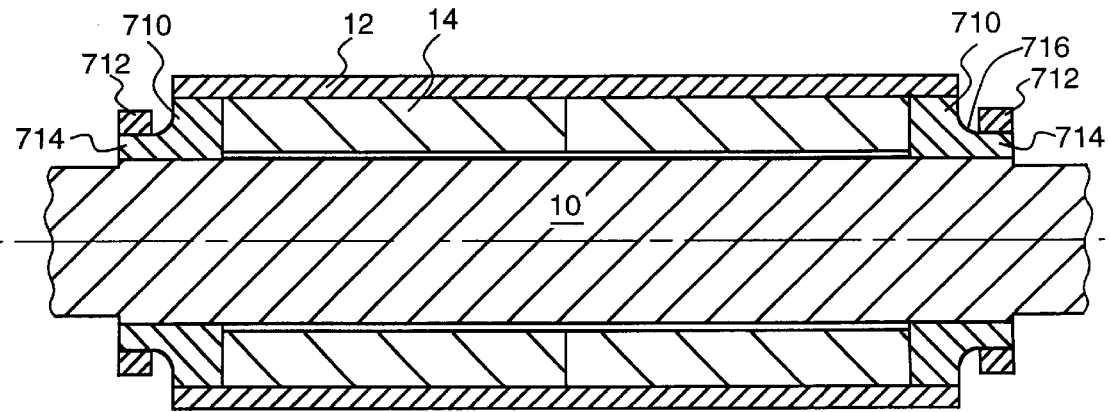
FIG. 7 is a view similar to that of FIG. 1, further showing supports and rings.

FIG. 7 is a view similar to that of FIG. 1, further showing supports 710 and rings 712. Preferably, the supports comprise a non-magnetic material such as an INCONEL™ metal alloy. The retainer temperature can be raised and the magnets 14 can be inserted in retainer 12. Supports 710 can then be positioned, lightly shrunk, and welded in position by any convenient process. Increased welding flexibility is provided because the supports and retainers are not yet on the rotor shaft. Flexibility is further increased if the retainer and support materials are the same and the welds are therefore between identical metals.

If the supports are a non-magnetic material, they will not drain flux from the magnets as magnetic pieces would do. Therefore, less magnet material is required. The supports can made with extensions 714 for ease of mounting to the shaft. Appropriate dimensions will depend on such factors as fits, materials, and temperatures in the design. A fillet 716 is useful so that stress concentration at the corner where an extension extends from a support is minimized.

The retainer, supports, and magnets are slid onto shaft 10 with a light interference fit between the retainer and the shaft. In one embodiment, the clearance between the magnets and the shaft is about 5 mils. In this embodiment, the shaft can be more simply machined because no pockets or protrusions need be used.

Shrink rings 712 can be applied to the support extensions 714. A tight interference fit can be used because the shrink ring temperature can be made quite high without harming the magnets or disturbing the welds of the supports to the retainer. In one embodiment, the shrink rings comprise chromium-molybdenum steel or INCONEL™ alloy, for example.

Figure 8:
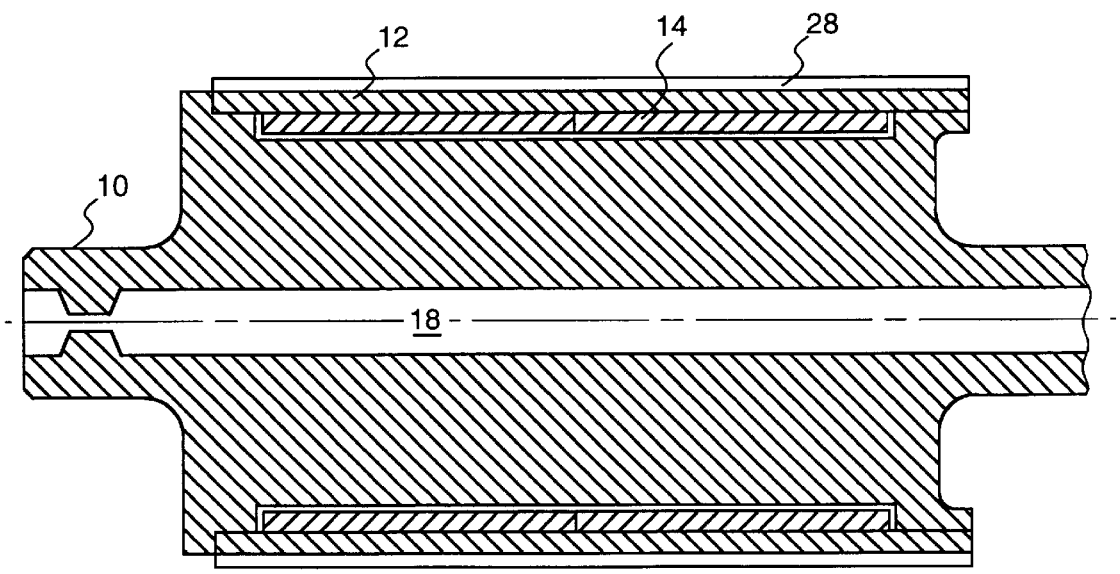
FIG. 8 is a view similar to that of FIG. 1, further showing a layer of high conductivity material overlying the retainer.

FIG. 8 is a view similar to that of FIG. 1, further showing a layer 28 of high conductivity material overlying retainer 12.

A surface magnet brushless DC motor typically comprises a slotted or salient pole stator with windings, a rotor including a solid core and shaft of high permeability magnetic steel (a conductor), and magnets surrounding the rotor core. Harmonic fields resulting from slotting of the stator and chopping of the power electronics induce losses in materials of the rotor. The magnets themselves are often electrical conductors and therefore the site of losses due to space and time harmonic fields.

As discussed above, in many permanent magnet motors, especially high speed motors, a retainer 12 of non-magnetic high strength material covers the magnets. The retainer is often an electrical conductor and hence the site of eddy current losses due to harmonic fields. The harmonic fields have two sources. One source is a high frequency current ripple in the stator windings (not shown) due to the chopping or pulse width modulation operation of the power electronic drivers. This source is higher in frequency than the fundamental or torque producing frequency. The second source is the spatial variation of the stator fields due to slotting or salient poles in the stator.

The eddy current losses in the conducting regions affected by the harmonic fields can be of a nature that is resistance-limited, reaction-limited, or inductance-limited. In the situation of a resistance limitation, the reaction fields resulting from induced currents are negligible compared to the imposed fields. Therefore, voltages will be induced in the conductors with the current limited only by the resistance of the medium. To compensate for this effect, the retainer or magnet resistivity is selected to be as large as possible.

In the situation of reaction limitation, the fields produced by the eddy currents are comparable to the imposed fields, and, in the ideal situation, exactly cancel them. Thus, as in an ideal transformer, the currents in the retainer or magnet will equal the driving current in the stator (the ripple current). In this situation the method for reducing losses is to make the retainer or magnet resistivity as small as possible. Generally, reaction-limited losses are smaller than resistance-limited losses for the same material. Induction limitation situations result in the lowest losses but do not frequently occur.

Retainer losses due to inverter time harmonics are generally reaction-limited. Losses due to space harmonics appear to be resistance-limited because of the fixing of the flux by the magnets and a somewhat lower effective frequency. Therefore, it would be desirable to have resistivity high enough to minimize space harmonic losses and low enough to minimize time harmonic losses.

In the present invention, the high resistivity material is used for the retainer because of its mechanical requirements. The retainer can then be provided with a thin coat of high conductivity material. The conductivity and thickness are chosen such that it is reaction limiting for the high frequency time harmonics and thin enough not to interfere with fundamental flux penetration or yield excessive spatial harmonic losses.

In a design study, non-conducting magnets were surrounded by a nonmagnetic retainer having a thickness of about 100 mils and a resistivity about 120 microhms-centimeter (about seventy times the resistivity of copper). The retainer was found to be reaction-limited to the time harmonics but not to the space harmonics, and the time harmonics resulted in high losses. A layer of copper about 1.3 mils thick is expected to result in reaction-limiting of about the same order as the retainer but with much lower resistivity. A layer a few mils thick is expected to reduce the time harmonic losses considerably while not increasing the space harmonic losses too much. A balance in the electromagnetic design of such systems is necessary and can be aided by computer simulations.

Layer 28 can be shrunk on the retainer but is probably more conveniently and economically applied by electroplating. Because copper is a soft material, it will expand more than other metals under stress. Plating can bond copper to the substrate and prevent separation at high speeds. Other examples of useful materials for layer 28 include silver and gold.

Figure 9:
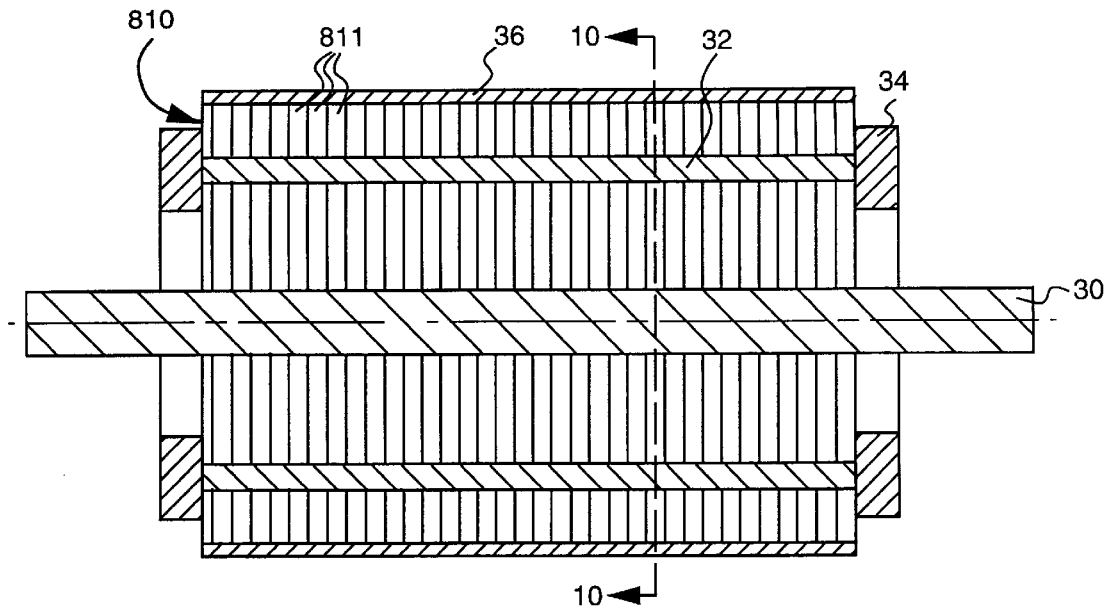
FIG. 9 is a sectional side view of another embodiment of a rotor of the present invention including a layer of high conductivity material overlying induction motor rotor laminations.
Figure 10:
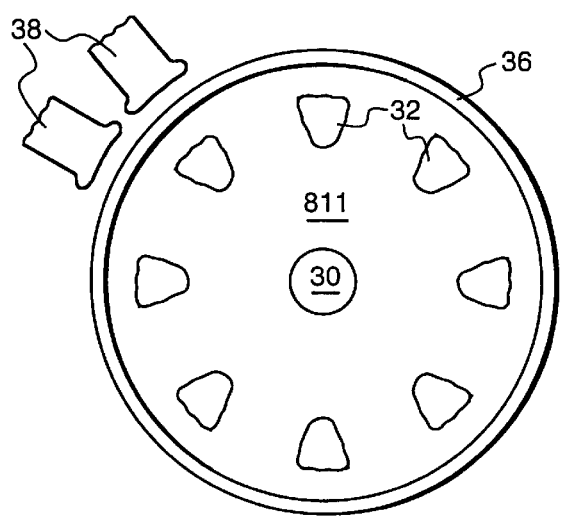
FIG. 10 is view along line 10—10 of FIG. 9.

FIG. 9 is a sectional side view of another embodiment of a rotor of the present invention including a layer of high conductivity material 36 overlying induction motor rotor 810 laminations 811 with rotor bars 32, and FIG. 10 is view along line 10—10 of FIG. 9.

The technique is useful in induction motors for reducing the time harmonic induced losses in the rotor. The theory is contrary to the usual rule of carefully treating the surface so that there is no connection between rotor laminations. The reasons for laminating induction motor rotors are generally to (1) assure flux penetration, (2) minimize rotor core losses, and (3) minimize the "pole face" component of the stray load losses from stator pole teeth 38.

Because slip is on the order of 1% or less in a typical high efficiency, high speed motor, the torque producing frequency is very low (under 10 hertz) in the rotor. Therefore, rotor core losses can be kept low and flux penetration can be assured even if the laminations are not well isolated. Low order harmonics of the inverter may be present. However, a thin copper layer can be more effective than a well-isolated lamination stack at reducing time harmonic surface losses. For each particular situation, a computer simulation can be used to evaluate the trade-off and design parameters.

A further issue is the eddy currents in the bars which would be shielded by the copper layer but unaffected by better laminations. Because there are no permanent magnets, the induction motor harmonic fields are not embedded and the copper layer may actually improve the efficiency of a standard sixty hertz fixed frequency industrial induction motor.

Figure 11:
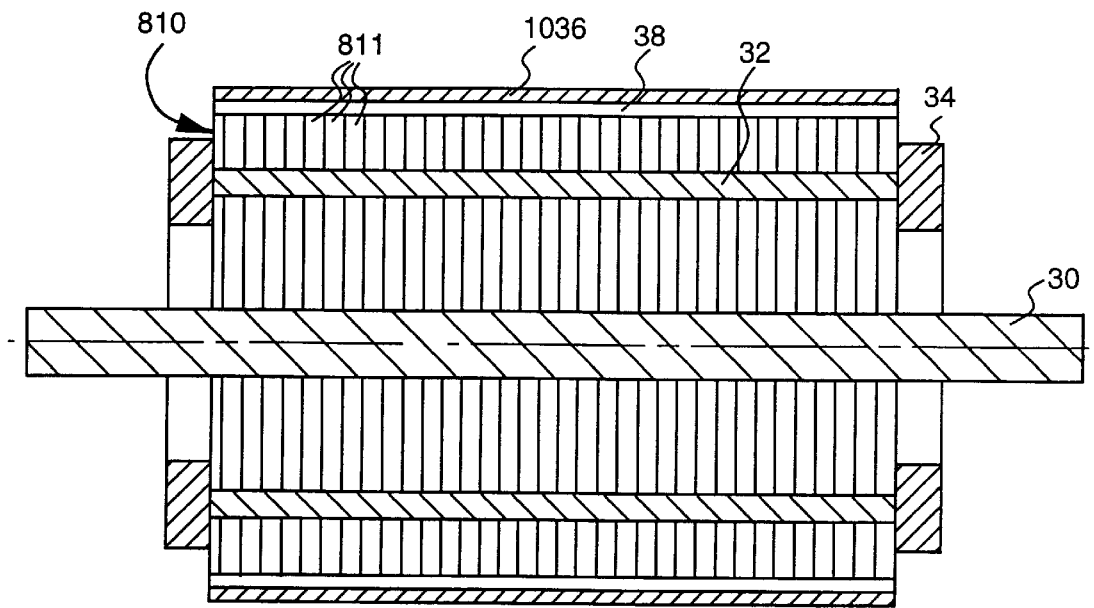
FIG. 11 is a view similar to that of FIG. 9, further showing an oxide layer between the rotor laminations and the layer of high conductivity.

FIG. 11 is a view similar to that of FIG. 9, further showing an oxide layer 38 between the rotor laminations 811 and a layer of high conductivity 1036. Oxide layer 38 permits the laminations to remain isolated. In one embodiment, layer of high conductivity 1036 is applied by a shrink fit process.

Figure 12:
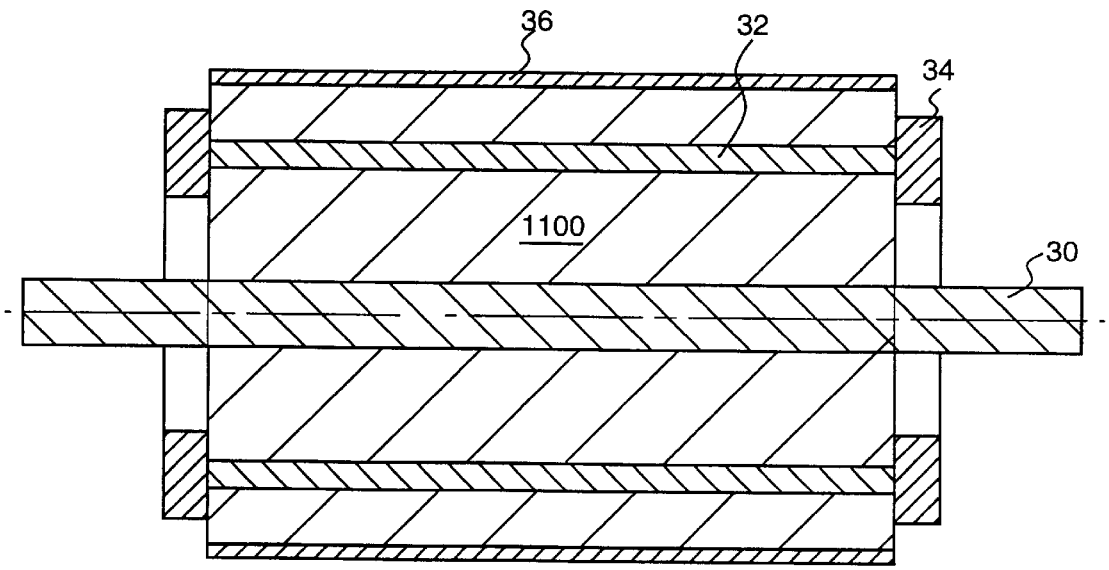
FIG. 12 is a view similar to that of FIG. 9, wherein the motor rotor comprises a solid rotor core instead of a laminated rotor core.

FIG. 12 is a view similar to that of FIG. 9, wherein the motor rotor 1100 comprises a solid rotor core instead of a laminated rotor core. This embodiment would be useful if the shielding of the copper layer is sufficient to exclude the time harmonic fields from the rotor body thus reducing the eddy current and hysteresis losses in the solid core. Solid core rotors are particularly useful for large moderate speed and small high speed induction motor rotors.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of fabricating a rotor comprising the steps of:
    providing a permanent magnet layer having an inner surface concentric to a rotor shaft, the permanent magnet layer having an inner diameter which is greater than an outer diameter of the rotor shaft, the permanent magnet layer and the rotor shaft having an open radial gap extending from the inner surface of the permanent magnetic layer to the rotor shaft;
    providing a metallic retainer around the permanent magnet layer; and
    attaching the retainer to the rotor shaft.

2. The method of claim 1, wherein the step of providing the permanent magnet layer on the rotor shaft comprises providing a ring magnet around the rotor shaft, the ring magnet comprising a material less stiff than a material of the retainer so as to expand to remain in contact with the retainer as a speed of the rotor is increased.

3. The method of claim 2, wherein the step of providing the ring magnet comprises providing a molded magnet around the rotor shaft.

4. The method of claim 2, wherein the rotor has one end free to permit axial application of the ring magnet and wherein the step of providing the ring magnet comprises sliding the ring magnet around the rotor.

5. The method of claim 4, wherein the step of sliding the ring magnet around the rotor comprises:
    providing a light interference fit between the ring magnet and the retainer,
    chilling the rotor shaft,
    sliding the ring magnet and the retainer around the rotor shaft, and
    welding the retainer to the rotor shaft.

6. The method of claim 5, wherein the rotor shaft includes a projection and the step of attaching the retainer to the rotor shaft comprises welding the retainer to the projection of the rotor shaft, welding the retainer to a cap, and welding the cap to the shaft.

7. The method of claim 1, wherein the steps of providing the permanent magnet layer and providing the retainer comprise providing a light interference fit between the magnet layer and the retainer, attaching supports to ends of the retainer, and sliding the magnet layer, the retainer, and the supports around the rotor shaft.

8. The method of claim 7, further including applying shrink rings around the supports.

9. The method of claim 1, wherein the step of providing the permanent magnet layer comprises applying a plurality of magnet segments around the rotor shaft.

10. The method of claim 9, wherein the rotor shaft includes pockets and the step of applying the plurality of magnet segments includes situating the magnet segments in respective pockets.

11. The method of claim 10, further including, prior to applying the plurality of magnet segments, applying springs in the rotor pockets for preloading the magnet segments against the inside of the retainer.

12. The method of claim 9, further including, prior to applying the plurality of magnet segments, applying a cage for situating the plurality of magnet segments around the rotor shaft.

13. The method of claim 1, further including the step of applying a high conductivity material over the retainer, the combination of the retainer and the high conductivity material having a resistivity high enough to minimize space harmonic losses and low enough to minimize time harmonic losses.

14. A method of fabricating a rotor comprising the steps of:
    providing a permanent magnet layer having an inner surface concentric to a rotor shaft, the permanent magnet layer having an inner diameter which is greater than an outer diameter of the rotor shaft and comprising a plurality of magnet segments around the rotor shaft, the permanent magnet layer and the rotor shaft having an open radial gap extending for the inner surface of the permanent magnetic layer to the rotor shaft;
    providing a metallic retainer around the permanent magnet layer; and
    attaching the retainer to the rotor shaft.

15. The method of claim 9, wherein the rotor shaft includes pockets and the step of providing the permanent magnet layer includes situating the magnet segments in respective pockets.

16. The method of claim 15, further including, prior to situating the magnet segments, applying springs in the rotor pockets for preloading the magnet segments against the inside of the retainer.

17. The method of claim 14, further including, prior to situating the magnet segments, applying a cage for situating the plurality of magnet segments around the rotor shaft.

* * * * *